(12) United States Patent
Walters et al.

(10) Patent No.: US 11,354,567 B2
(45) Date of Patent: *Jun. 7, 2022

(54) SYSTEMS AND METHODS FOR CLASSIFYING DATA SETS USING CORRESPONDING NEURAL NETWORKS

(71) Applicant: Capital One Services, LLC, McLean, VA (US)

(72) Inventors: Austin Walters, Savoy, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,423

(22) Filed: Apr. 14, 2021

(65) Prior Publication Data
US 2021/0232896 A1    Jul. 29, 2021

Related U.S. Application Data

(63) Continuation of application No. 16/533,770, filed on Aug. 6, 2019, now Pat. No. 10,997,495.

(51) Int. Cl.
*G06N 3/04* (2006.01)
*G06K 9/62* (2022.01)

(52) U.S. Cl.
CPC ......... *G06N 3/0472* (2013.01); *G06K 9/6267* (2013.01); *G06N 3/0454* (2013.01)

(58) Field of Classification Search
None
See application file for complete search history.

(56) References Cited

U.S. PATENT DOCUMENTS

| | | | | |
|---|---|---|---|---|
| 7,026,121 B1 * | 4/2006 | Wohlgemuth | ....... | C12Q 1/6883 435/6.1 |
| 7,130,834 B2 * | 10/2006 | Anderson | ................ | G06K 9/62 706/15 |
| 8,255,948 B1 * | 8/2012 | Black | ................... | H04N 21/252 725/35 |
| 10,235,601 B1 | 3/2019 | Wrenninge et al. | | |

(Continued)

OTHER PUBLICATIONS

Marco Tulio Ribeiro et al., "'Why Should I Trust You?' Explaining the Predictions of Any Classifer," arXiv (2016), retrieved from https://arxiv.org/pdf/1602.04938.pdf, 15 pages.

*Primary Examiner* — Fateh M Obaid
(74) *Attorney, Agent, or Firm* — Finnegan, Henderson, Farabow, Garrett & Dunner, L.L.P.

(57) ABSTRACT

The present disclosure relates to systems and methods for classifying data sets using associated functions from neural networks. In one example, a system for classifying data sets by corresponding functions includes at least one processor and at least one non-transitory memory storing instructions that, when executed by the at least one processor cause the system to perform operations including: obtaining a neural network associated with a data set, the neural network being trained to generate synthetic data sets related to the data set; selecting a test set of inputs to the neural network; obtaining a corresponding set of outputs by applying the neural network to the test set of inputs; estimating one or more functions describing the test set of inputs and the corresponding set of outputs; and indexing the estimated one or more functions to the data.

20 Claims, 10 Drawing Sheets

(56) References Cited

U.S. PATENT DOCUMENTS

| | | | | |
|---|---|---|---|---|
| 10,614,031 | B1* | 4/2020 | Walters | G06F 16/13 |
| 2003/0022200 | A1* | 1/2003 | Vissing | G16B 50/20 |
| | | | | 435/6.18 |
| 2008/0025591 | A1* | 1/2008 | Bhanot | G06K 9/6262 |
| | | | | 382/132 |
| 2008/0027886 | A1* | 1/2008 | Kowalczyk | G06K 9/6256 |
| | | | | 706/21 |
| 2008/0187207 | A1* | 8/2008 | Bhanot | G06K 9/00536 |
| | | | | 382/132 |
| 2011/0219008 | A1* | 9/2011 | Been | G06F 16/23 |
| | | | | 707/E17.049 |
| 2011/0236903 | A1* | 9/2011 | McClelland | C12Q 1/6886 |
| | | | | 435/6.14 |
| 2011/0264646 | A1* | 10/2011 | Sokolan | G06F 16/951 |
| | | | | 707/711 |
| 2014/0040273 | A1* | 2/2014 | Cooper | G06F 16/41 |
| | | | | 707/E17.061 |
| 2014/0156576 | A1* | 6/2014 | Nugent | G06N 3/049 |
| | | | | 706/25 |
| 2017/0116498 | A1* | 4/2017 | Raveane | G06K 9/6257 |
| 2017/0168586 | A1 | 6/2017 | Sinha et al. | |
| 2018/0165554 | A1* | 6/2018 | Zhang | G06K 9/6256 |
| 2018/0174035 | A1 | 6/2018 | Nugent et al. | |
| 2018/0188403 | A1 | 7/2018 | Halsey et al. | |
| 2018/0268255 | A1* | 9/2018 | Surazhsky | G06N 3/0454 |
| 2019/0012581 | A1* | 1/2019 | Honkala | G06N 3/0481 |
| 2019/0026550 | A1* | 1/2019 | Yang | G06N 3/0454 |
| 2019/0050727 | A1 | 2/2019 | Anderson et al. | |
| 2019/0080164 | A1 | 3/2019 | Duke et al. | |
| 2019/0228495 | A1 | 7/2019 | Tremblay et al. | |
| 2020/0311911 | A1 | 10/2020 | Poole | |
| 2020/0342652 | A1* | 10/2020 | Rowell | G06T 15/20 |

\* cited by examiner

SYSTEMS AND METHODS FOR CLASSIFYING DATA SETS USING CORRESPONDING NEURAL NETWORKS

PRIORITY CLAIM

This application is a continuation of U.S. patent application Ser. No. 16/533,770, filed Aug. 6, 2019, now allowed, which is expressly incorporated herein by reference in its entirety.

TECHNICAL FIELD

The disclosed embodiments relate to a platform for classifying data sets based on associated neural networks. In particular, the disclosed embodiments relate to techniques for estimating one or more functions based on a neural network associated with a data set and classifying the data set accordingly. In addition, the disclosed embodiments may train the associated neural network, e.g., to generate synthetic data based on the data set.

BACKGROUND

Modern computing often uses a large number of data sets, whether text files, images, or other formats (such as portable document format (pdf), Microsoft Word® format, Microsoft Excel® format or the like). However, it is difficult and costly to maintain and store these data sets in a meaningful fashion. Indeed, conventionally, many data sets are lost on company-wide systems due to inability to effectively find and use sets, especially when data sets are dumped into a data lake rather than indexed and stored.

Moreover, traditional mechanisms of indexing data sets generally focus on the data sets themselves. However, this may limit the type of dimensions used to index, compare, and search the data sets. Embodiments of the present disclosure may solve these technical problems.

SUMMARY

Consistent with disclosed embodiments, systems, methods, and computer readable media are provided for indexing and mapping models by hyperparameters as well as searching indexed models.

The disclosed embodiments may include a system for classifying data sets by corresponding functions. The system may comprise at least one processor and at least one non-transitory memory storing instructions that, when executed by the at least one processor cause the at least one processor to perform operations. The operations may comprise obtaining a neural network associated with a data set, the neural network being trained to generate synthetic data sets related to the data set; selecting a test set of inputs to the neural network; obtaining a corresponding set of outputs by applying the neural network to the test set of inputs; estimating one or more functions describing the test set of inputs and the corresponding set of outputs; and indexing the estimated one or more functions to the data set.

The disclosed embodiments may further include a system for classifying data sets by corresponding functions. The system may comprise at least one processor and at least one non-transitory memory storing instructions that, when executed by the at least one processor cause the at least one processor to perform operations. The operations may comprise obtaining a data set; using the data set, training a neural network to generate synthetic data sets related to the data set; selecting a test set of inputs to the neural network; obtaining a corresponding set of outputs by applying the neural network to the test set of inputs; estimating one or more functions describing the test set of inputs and the corresponding set of outputs; and indexing the estimated one or more functions to the data set.

The disclosed embodiments may further include a system for classifying data sets by corresponding functions. The system may comprise at least one processor and at least one non-transitory memory storing instructions that, when executed by the at least one processor cause the at least one processor to perform operations. The operations may comprise obtaining a data set; generating a neural network with a structure comprising a plurality of nodes across a plurality of layers; using the data set, training the neural network to generate synthetic data sets related to the data set; selecting a test set of inputs to the neural network; obtaining a corresponding set of outputs by applying the neural network to the test set of inputs; estimating one or more functions describing the test set of inputs and the corresponding set of outputs; using the one or more functions, determine branches of the structure that are correlated with different parts of the test set of inputs; and indexing the estimated one or more functions to the determined branches.

Consistent with other disclosed embodiments, non-transitory computer readable storage media may store program instructions, which are executed by at least one processor device and perform any of the methods described herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments consistent with the disclosure and, together with the description, serve to explain the principles of the disclosure. The drawings are not necessarily to scale or exhaustive. Instead, emphasis is generally placed upon illustrating the principles of the embodiments described herein. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the materials, methods, and examples are illustrative only and are not intended to be necessarily limiting.

The disclosed embodiments can be used to automatically index and search data sets more accurately and robustly. Using functions estimating associated neural networks, the disclosed embodiments provide additional robustness and accuracy for indexing the data sets. In some aspects, the data sets may comprise unstructured data, such as one or more JSON (JavaScript Object Notation), one or more delimited files (e.g., comma-separated value (CSV) files or the like), or the like or structured data, such as one or more relational data structures (e.g., tabular data or the like), one or more graphical data structures, or the like. In various embodiments, the disclosed systems may use local functions estimating global functions of neural networks in order to increase robustness as compared with other techniques for indexing data sets.

Figure 1:
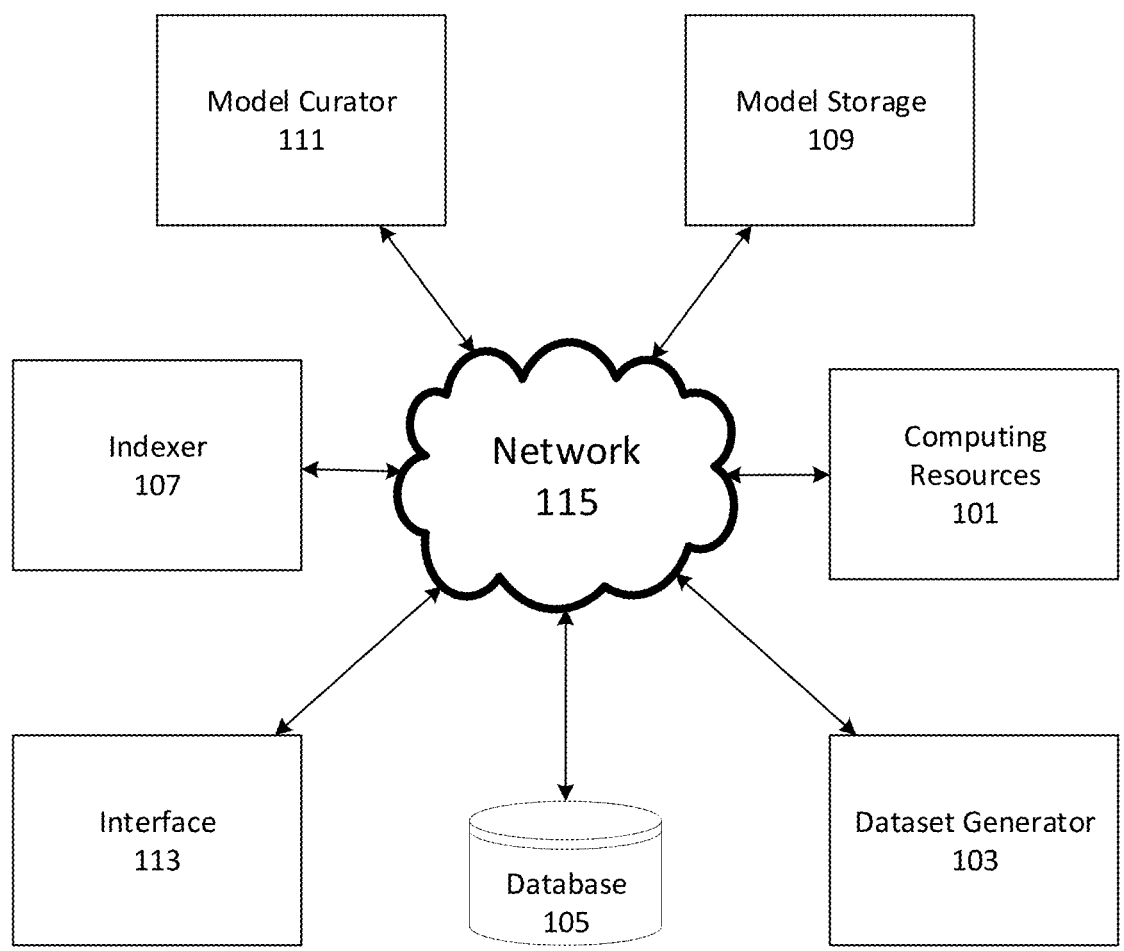
FIG. 1 depicts an exemplary cloud-computing environment for indexing and searching data sets, consistent with disclosed embodiments.

FIG. 1 depicts a cloud-computing environment 100 for indexing and searching data sets. Environment 100 can be configured to support indexing of data sets, searching and retrieval of data sets, training neural networks and other models on data sets, and imposition of rules on indexed data sets. Environment 100 can be configured to expose an interface for communication with other systems. Environment 100 can include computing resources 101, data set generator 103, database 105, indexer 107, model storage 109, model curator 111, and interface 113. These components of environment 100 can be configured to communicate with each other, or with external components of environment 100, using network 115. The particular arrangement of components depicted in FIG. 1 is not intended to be limiting. System 100 can include additional components, or fewer components. Multiple components of system 100 can be implemented using the same physical computing device or different physical computing devices.

Computing resources 101 can include one or more computing devices configurable to index and search data sets. The computing devices can be special-purpose computing devices, such as graphical processing units (GPUs) or application-specific integrated circuits. The cloud computing resources can be general-purpose computing devices. The computing devices can be configured to host an environment for indexing and searching data sets. For example, the computing devices can host virtual machines, pods, or containers. The computing devices can be configured to run applications for generating data models. For example, the computing devices can be configured to run SAGEMAKER, Tensorflow, or similar machine learning training applications. Computing resources 101 can be configured to receive models for training from model storage 109, or another component of system 100. Computing resources 101 can be configured to index and search data sets using functions estimating, at least locally, associated neural networks. For example, computing resources 101 may select a test set of inputs (e.g., using a Monte Carlo algorithm or other simulation algorithm), apply the associated neural networks to the test set to generate an output set, and estimate one or more functions based on the test set and the output set. In some embodiments, computing resources 101 may also train the associated neural networks, e.g., to generate synthetic data related to the data sets.

Data set generator 103 can include one or more computing devices configured to generate data. Data set generator 103 can be configured to provide data to computing resources 101, database 105, to another component of system 100 (e.g., interface 113), or another system (e.g., an APACHE KAFKA cluster or other publication service). Data set generator 103 can be configured to receive data from database 105 or another component of system 100. Data set generator 103 can be configured to receive data models from model storage 109 or another component of system 100. In some embodiments, data set generator 103 can be configured to generate synthetic data. For example, data set generator 103 can be configured to generate synthetic data by identifying and replacing sensitive information in data received from database 103 or interface 113. As an additional example, data set generator 103 can be configured to generate synthetic data using a data model without reliance on input data. For example, the data model can be configured to generate data matching statistical and content characteristics of a training data set. In some aspects, the data model can be configured to map from a random or pseudorandom vector to elements in the training data space.

In any embodiments where data set generator 103 generates synthetic data, data set generator 103 may use one or more neural networks, e.g., retrieved from model storage 109, trained using stored data sets, or the like. Accordingly, data set generator 103 may generate data with the neural network(s) and/or provide the neural network(s) to indexer 107 for further processing.

Database 105 can include one or more databases configured to store indexed data sets for use by system 100. Additionally or alternatively, database 105 may store models associated with data sets. For example, database 105 may store models associated with generalized representations of those models (e.g., neural network architectures stored in TensorFlow or other standardized formats). The databases can include cloud-based databases (e.g., AMAZON WEB SERVICES S3 buckets) or on-premises databases. As explained above, the models may comprise one or more neural networks configured to generate synthetic data sets.

Indexer 107 can include one or more computing systems configured to index data models for system 100. For example, indexer 107 can be configured to estimate functions based on input sets and output sets from neural networks associated with data sets before indexing and subsequent searching of those data sets by computing resources 101. Thus, the index for the data sets may comprise the functions. Additionally or alternatively, in embodiments where indexer 107 trained the neural networks or otherwise obtains data structures indicating structures of the neural networks, indexer 107 may map the functions to particular branches within the structures. Thus, the index for the data sets may comprise the functions and/or the particular branches. The neural network(s) associated with the data sets may comprise one or more neural networks configured to parse the data (e.g., convert unstructured data of the set to structured data) or configured to generate synthetic data sets based on the input data sets.

Indexer 107 can also be configured to search the indexed data sets based on instructions received from a user or another system. These instructions can be received through interface 113. For example, indexer 107 can be configured to receive a search query and retrieve data sets based on the query and using functions estimated by indexer 107 with computing resources 101. For example, the query may comprise one or more functions, and indexer 107 may retrieve data sets indexed to the function(s) or to one or more similar functions. As used herein, a similar function may comprise any similarity in domain (e.g., overlapping input spaces beyond a threshold, such as an area threshold, a volume threshold, or the like), any similarity in range (e.g., overlapping output spaces beyond a threshold, such as an area threshold, a volume threshold, or the like), any similarity in type (e.g., same order of polynomial, one or more coefficients within a threshold, same expression in a numerator or denominator of a rational function, expressions in a numerator or denominator of a rational function having constants or coefficients or orders within a threshold, or the like), etc.

Additionally or alternatively, indexer 107 can be configured to estimate one or more functions based on the query in order to search the indexed data sets using the function(s). For example, the query may comprise a neural network configured to parse data (e.g., convert unstructured data to structured data) or configured to generate synthetic data sets. Accordingly, indexer 107 may apply the query to a test set of inputs, obtain a corresponding set of outputs, and estimate the one or more functions based on the set of inputs and the set of outputs. Indexer 107 may retrieve data sets indexed to the estimated function(s) or to one or more similar functions.

Model storage 109 can include one or more databases configured to store data models associated with the data sets. For example, the data models may comprise parsing models, synthetic data generation models, or the like. Model storage 109 can be configured to provide information regarding available data models to a user or another system (e.g. indexer 107). This information can be provided using interface 113. The databases can include cloud-based databases (e.g., AMAZON WEB SERVICES S3 buckets) or on-premises databases. The information can include metadata associated with the models, as explained above.

Model curator 111 can be configured to train the models stored in storage 109. For example, model curator 111 can be configured to train neural networks to parse data sets and/or generate synthetic data sets, as explained above. Training may use the data sets as input and include modification of weights and/or activation functions of nodes within the neural network to reduce one or more associated loss functions.

Interface 113 can be configured to manage interactions between system 100 and other systems using network 115. In some aspects, interface 113 can be configured to publish data received from other components of system 100 (e.g., data set generator 103, computing resources 101, database 105, or the like). This data can be published in a publication and subscription framework (e.g., using APACHE KAFKA), through a network socket, in response to queries from other systems, or using other known methods. The data can be synthetic data, as described herein. As an additional example, interface 113 can be configured to provide results from indexed data sets in database 105 in response to a query received via interface 113. In various aspects, interface 113 can be configured to provide data or instructions received from other systems to components of system 100. For example, interface 113 can be configured to receive instructions for retrieving data sets (e.g., according to a query of indexed functions) from another system and provide this information to indexer 107. As an additional example, interface 113 can be configured to receive data including sensitive portions from another system (e.g. in a file, a message in a publication and subscription framework, a network socket, or the like) and provide that data to data set generator 103 or database 105.

Network 115 can include any combination of electronics communications networks enabling communication between components of system 100. For example, network 115 may include the Internet and/or any type of wide area network, an intranet, a metropolitan area network, a local area network (LAN), a wireless network, a cellular communications network, a Bluetooth network, a radio network, a device bus, or any other type of electronics communications network know to one of skill in the art.

Disclosed herein are improved systems and methods for efficiently searching and indexing data sets. In some embodiments, functions that locally estimate global functions of neural networks related to the data sets may be used to index the data sets. Additionally or alternatively, branches of the related neural networks mapped to the locally estimated functions may be used to index the data sets.

These data models may generate synthetic data. For example, the data models may be trained using the data sets to generate synthetic data sets with structural similarities to the data sets used for training. Additionally or alternatively, these data models may parse unstructured data to generate structured data. As used herein, "unstructured" does not necessarily refer to data that is haphazard or lacking in discernible patterns. Rather, "unstructured" data may refer to data stored without logical connection among portions even if the data is stored, for example, as a text file with a pattern and delimiter that impart meaning to the data even though no logical connection is stored. Accordingly, the "structure" of any unstructured data may comprise patterns, delimiters, and other components of the data that impart meaning.

Figure 2A:
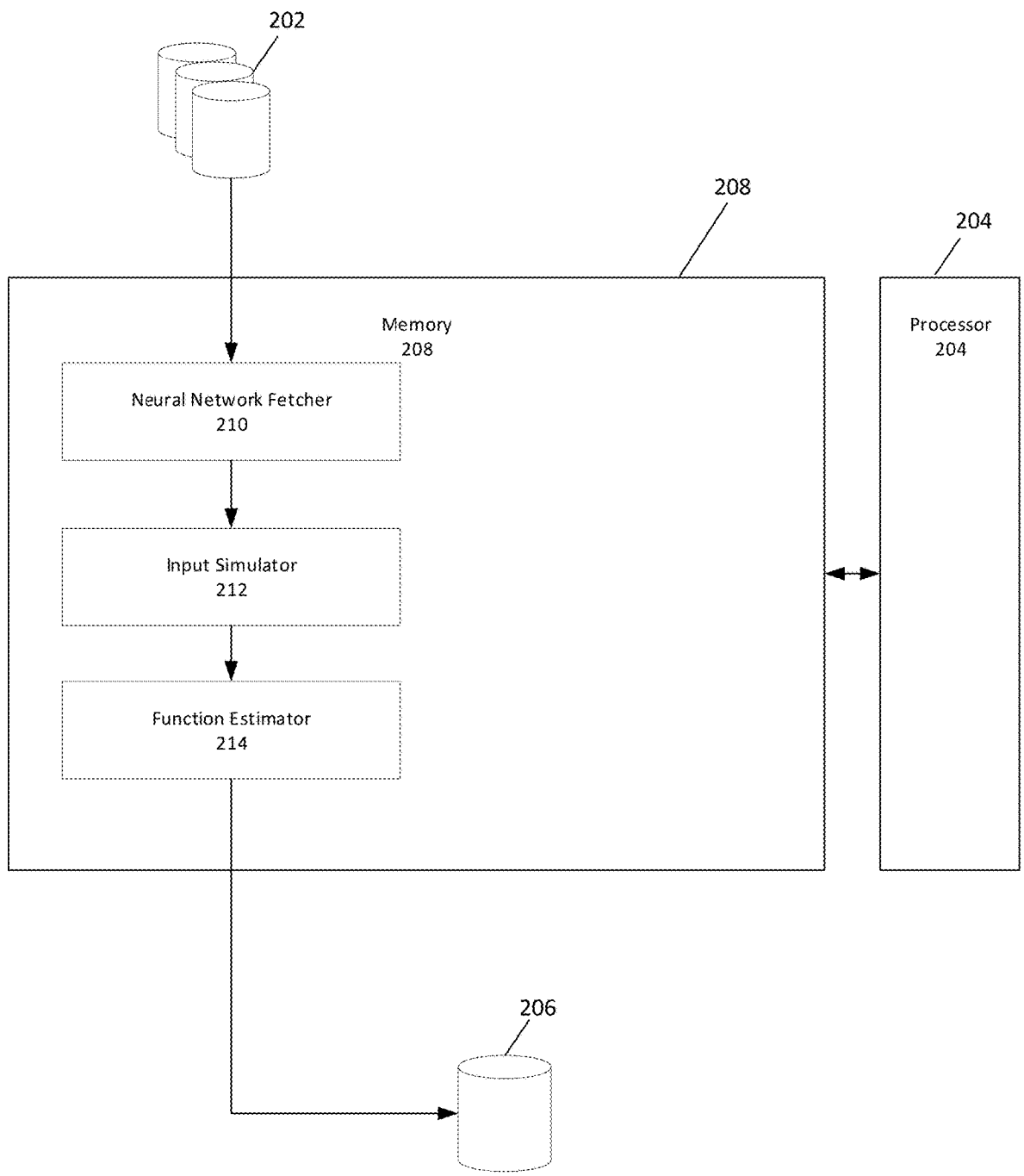
FIG. 2A depicts an exemplary system for indexing data sets using associated neural networks, consistent with disclosed embodiments.

FIG. 2A depicts an exemplary system 200 for indexing data sets, consistent with disclosed embodiments. System 200 may include one or more databases 202, one or more processors 204, and one or more databases 206. The one or more processors may execute one or more programs (e.g., neural network fetcher 210, input simulator 212, and function estimator 214) for indexing data sets. The one or more programs may be stored in a memory 208, as depicted in FIG. 2A. System 200 may be implemented as a component of system 100 or may be a system separate from system 100.

Databases 202 may include one or more databases configured to store data sets for use by system 200. In some embodiments, databases 202 may be included in database 115 of system 100. Databases 202 can include cloud-based databases (e.g., AMAZON WEB SERVICES S3 buckets) and/or on-premises databases. In some embodiments, databases 202 may additionally store data models for parsing the data sets (e.g., from unstructured data to structured data) or for generating synthetic data sets.

Databases 206 may also include one or more databases configured to store data for use by system 200. Databases 206 can include cloud-based databases (e.g., AMAZON WEB SERVICES S3 buckets) and/or on-premises databases. In some embodiments, databases 206 may store training data for the data models and/or indexing information associated with the data sets. Database 206 may be included as a part of previously described database 115.

Neural network fetcher 210 may receive one or more data sets from databases 202. The one or more data sets may include text files (e.g., logs generated by one or more applications), image files, or any other set of unstructured or structured data. Neural network fetcher 210 may retrieve one or more models, e.g., from database 202, related to the one or more data sets. In an embodiment, the one or more models may comprise one or more linear regressions, neural networks, or the like that generate synthetic data with one or more structural similarities to the received data set(s). As used herein, a structural similarity may refer to any similarity in organization (e.g., one or more overlapping columns, form fields, or the like), any similarity in statistical measures (e.g., statistical distribution of letters, numbers, pixels, or the like), or the like. Accordingly, in one example, neural network fetcher 210 may retrieve the one or more models via an index linking the model(s) to the received data set(s), an edge linking node(s) representing the model(s) to node(s) representing the received data set(s), or any other data structure linking the model(s) to the received data set(s). Additionally or alternatively, neural network fetcher 210 may receive the one or more models, e.g., with the one or more data sets, from a query (e.g., as explained above with respect to FIG. 1), or the like.

In any of the embodiments described above, the model(s) may include statistical algorithms. For example, the model(s) may include regression models that estimate the relationships among variables associated with the received data set(s) and generate synthetic sets based thereon. In some aspects, the model(s) may additionally or alternatively sort elements of the received data set(s) using one or more classifiers to determine probabilities used to generate synthetic data sets based thereon. The model(s) may be parametric, non-parametric, and/or semi-parametric.

In some embodiments, the model(s) may include a convolutional neural network model. The convolutional neural network may comprise an input layer, one or more middle layers, and one or more output layers. In some embodiments, the input layer may comprise multiple matrices (e.g., a matrix for pixel values in an image, a matrix for characters in an input string, or the like). Alternatively, the input layer may comprise a single matrix (e.g., a single matrix of pixel brightness values, a single matrix of character distributions, or the like). In some aspects, one or more middle layers and/or the output layer may be a deterministic function of the values of the preceding layer.

The convolutional neural network may include one or more convolutional layers. A convolutional layer may be configured to convolve one or more spatial filters with the convolutional layer input to generate a convolutional layer output tensor. One or more spatial filter functions may be defined by a matrix of weights to be applied to the elements of the preceding layer during a convolution operation, an offset, and/or an activation function. Training the convolutional neural network may comprise modifying the weights and offsets using a backpropagation algorithm. In some embodiments, the convolutional neural network may also include pooling layers and/or fully connected layers.

Additionally or alternatively, the model(s) may include a deep fully connected neural network. The deep fully connected neural network may comprise an input layer, one or more middle layers, and one or more output layers. The middle layer(s) may be fully connected. Accordingly, one or more middle layers may have a plurality of neurons (or nodes), the neurons being connected to one or more (or all) neurons of the previously layer.

Additionally or alternatively, the model(s) may include a recurrent neural network. The recurrent neural network may comprise an input layer, one or more middle layers, and one or more output layers. The middle layer(s) may include a plurality of neurons (or nodes) that use input from one or more neurons of a previous layer in combination with previous (in time) states and/or outputs of the neuron itself.

Although the above examples include neural networks, other embodiments may include additional or alternative models. For example, additionally or alternatively, the model(s) may include Random Forests, composed of a combination of decision trees. Such decision trees may comprise a data structure mapping observations about an input, in the "branch" of the tree, to conclusions about a target value, in the "leaves" of the tree. In such aspects, the conclusions may be used to generate synthetic data based on the observations about the input. An individual tree may depend on the values of a random vector sampled independently and with the same distribution for a plurality of (or all) trees in the forest. Any other machine learned models may be applied in addition to or in lieu of a Random Forest model.

Input simulator 212 may receive one or more models retrieved by neural network fetcher 210. Moreover, input simulator 212 may select one or more inputs for the model(s). For example, input simulator 212 may retrieve a test set of inputs from database 202. In such embodiments, input simulator 212 may retrieve the test set via an index linking the test set to the model(s), an edge linking a node representing the test set to node(s) representing the model(s), or any other data structure linking the test set to the model(s). Additionally or alternatively, input simulator 212 may generate the test set of inputs. In such embodiments, input simulator 212 may generate one or more inputs structurally similar to the data set(s) received by neural network fetcher 210. Additionally or alternatively, input simulator 212 may use one or more simulation algorithms, such as a Monte Carlo simulator or the like, to generate the test set of inputs. For example, input simulator 212 may use the data set(s) or any other inputs linked to the model(s) as an initial position for the one or more simulation algorithms. Additionally or alternatively, input simulator 212 may generate one or more random or pseudo-random inputs as initial positions for the one or more simulation algorithms.

Figure 3A:
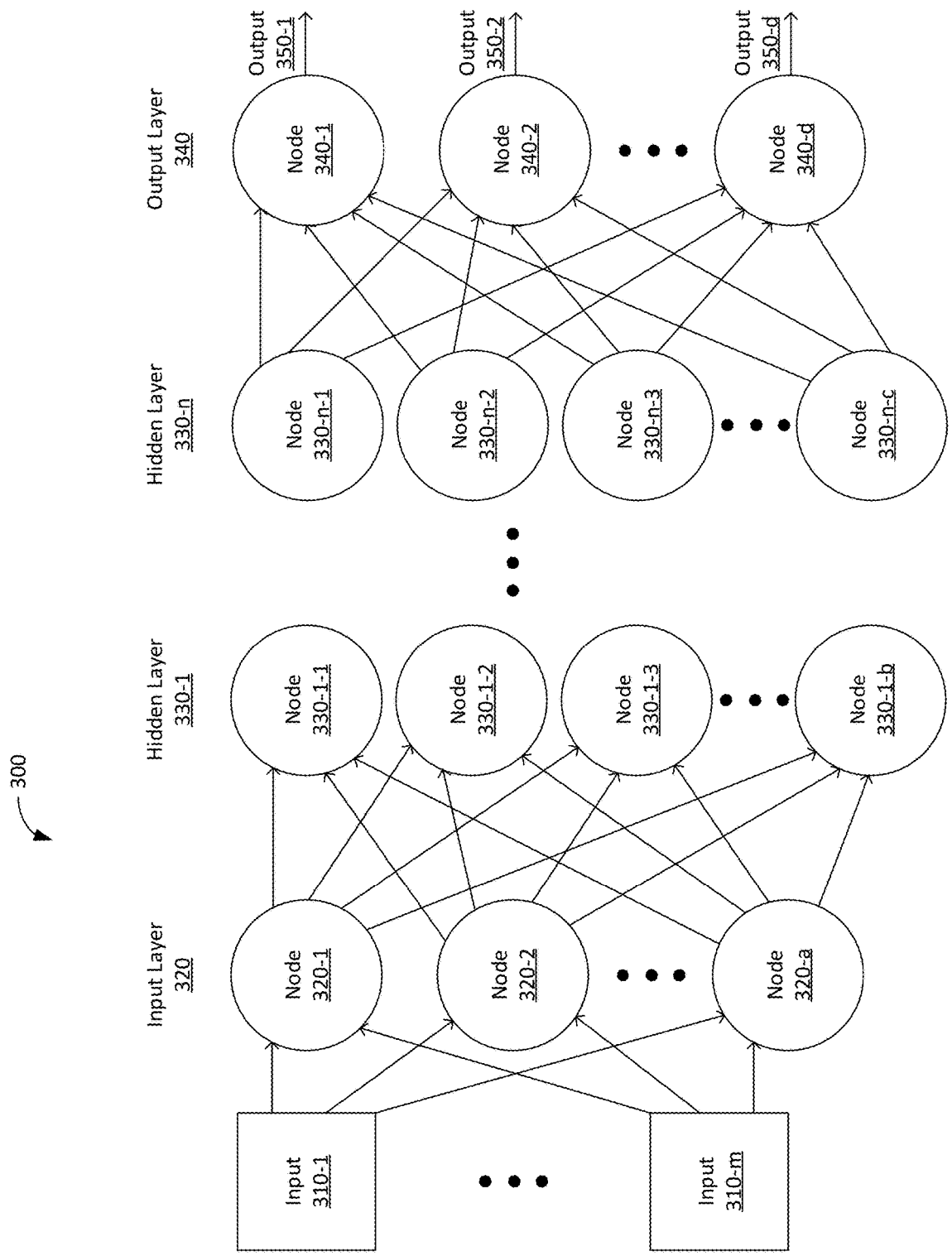
FIG. 3A depicts an exemplary neural network for synthetic data generation, consistent with disclosed embodiments.
Figure 3B:
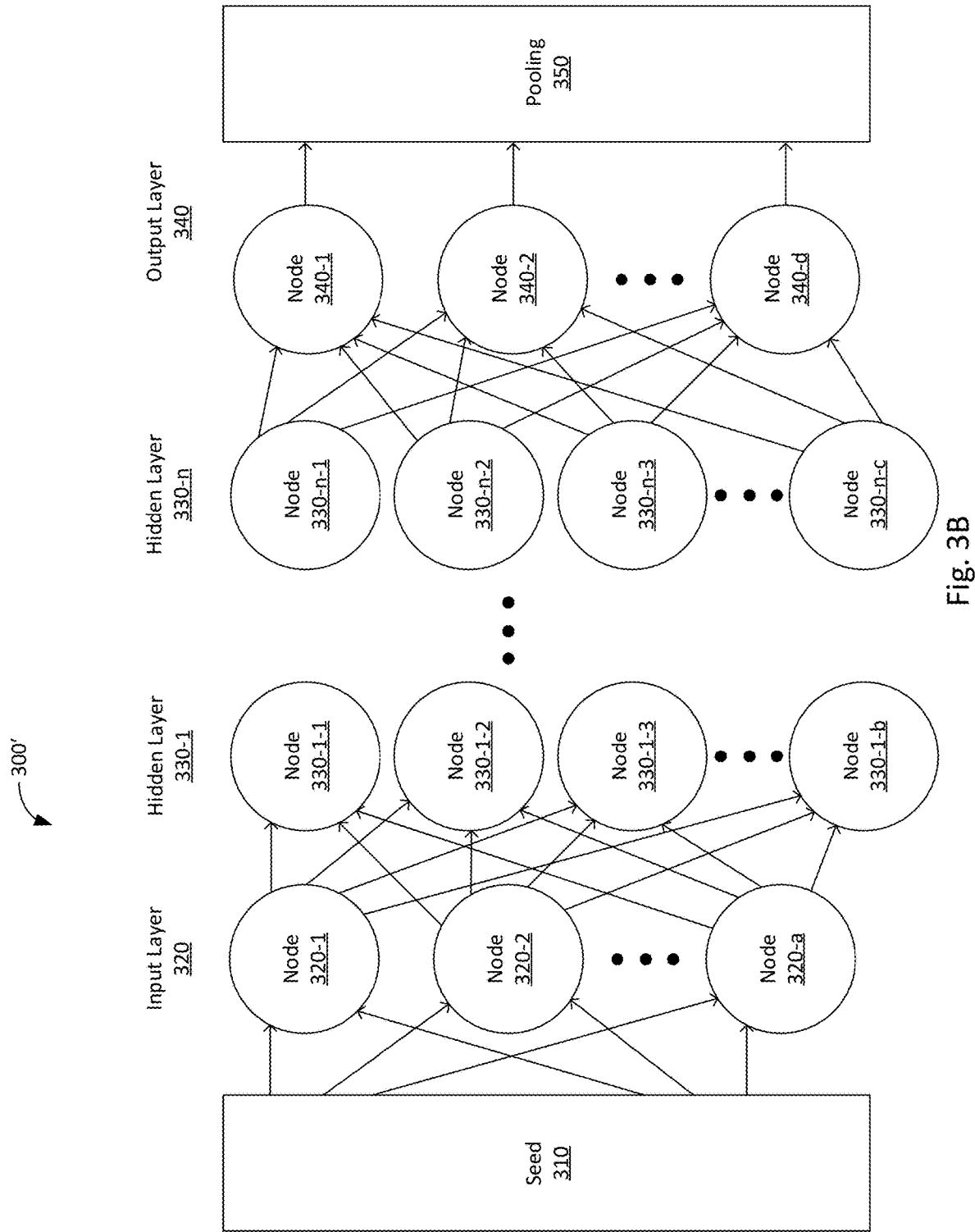
FIG. 3B depicts another exemplary neural network for synthetic data generation, consistent with disclosed embodiments.

Input simulator 212 may apply the model(s) to the test set of inputs to generate a corresponding set of outputs. For example, input simulator 212 may feed the test set to one or more input nodes of the model(s) (e.g., as depicted in FIG. 3A). Additionally or alternatively, input simulator 212 may generate one or more seed values (e.g., random values, pseudorandom values, Gaussian values, or the like) for the model(s) (e.g., as depicted in FIG. 3B). In embodiments where the model(s) comprise other types of models than neural networks, input simulator 212 may feed the test set as input as appropriate for the type.

Function estimator 214 may receive the test set of inputs and corresponding set of outputs and estimate a function based thereon. For example, function estimator 214 may employ a linear regression or Taylor series to estimate a polynomial function based on the test set of inputs and the corresponding set of outputs. Additionally or alternatively, function estimator 214 may employ a Fourier series to estimate a sinusoidal function based on the test set of inputs and the corresponding set of outputs. Function estimator 214 may thus calculate any function configured to model the test set of inputs to the corresponding set of outputs. For example, function estimator 214 may minimize squares, error values, a loss function, or any other measure of how closely the calculated functions fits the test set of inputs to the corresponding set of outputs.

In some embodiments, function estimator 214 may further estimate one or more features more likely to have resulted in the corresponding set of outputs from the test set of inputs than other features. For example, function estimator 214 may identify one or more features in the test set of inputs that are more likely to be explanatory based on a distance to the calculated function. Additionally or alternatively, function estimator 214 may assess commonality of features across the test set of inputs and the corresponding set of outputs and thus identify one or more features in the test set of inputs that are more likely to be explanatory.

In embodiments where a structure of the model(s) is known to function estimator 214 (e.g., having been stored with the model(s) or otherwise received by neural network fetcher 210), function estimator 214 may further map the estimated function(s) to one or more portions of the model(s). For example, if the model(s) comprise neural networks, function estimator 214 may map the estimated function(s) to one or more branches of the network(s). Accordingly, function estimator 214 may identify one or more activation functions within nodes of the one or more branches that are closest to the estimated function(s) (e.g., in absolute distance or in any other measure of distance between functions). Additionally or alternatively, function estimator 214 may map the identified one or more features to one or more portions of the model(s). For example, if the model(s) comprise neural networks, function estimator 214 may map the one or more features to one or more branches of the network(s). Accordingly, function estimator 214 may identify one or more activation functions within nodes of the one or more branches that are triggered by the one or more features.

Function estimator 214 may further index the received data set(s) by the estimated function(s), the one or more features, and/or the one or more portions of the model(s). Accordingly, function estimator 214 may generate a relational mapping, a graphical mapping, or any other index configured for use to search the received data set(s) based on the estimated function(s), the one or more features, and/or the portions of the model(s).

As further depicted in FIG. 2A, the indexed data sets may be output for storage, e.g., in databases 206. Additionally or alternatively, the indexed data sets may be output to an external device, e.g., another server, a third party data repository (e.g., AMAZON WEB SERVICES S3 buckets), a user such an administrator diagnosing a problem, or the like.

In some embodiments, system 200 may also execute a query against the indexed data set(s). For example, system 200 may receive a query for data sets, e.g., from an interface (not shown) connected to system 200. The query may include an example data set for which similar data sets are sought, one or more statistical measures or other structural descriptions of which data sets are sought, or any other information from which system 230 may retrieve one or more data sets.

Additionally or alternatively, the query may include one or more models for which relevant data sets are sought. The one or more data models may include one or more linear regressions, neural networks, or the like that parse unstructured data (e.g., of the sought data set(s)) into structured data. Additionally or alternatively, the one or more data models may include one or more linear regressions, neural networks, or the like that generate synthetic data with one or more structural similarities to the sought data set(s). As explained above, a structural similarity may refer to any similarity in organization (e.g., one or more overlapping columns, form fields, or the like), any similarity in statistical measures (e.g., statistical distribution of letters, numbers, pixels, or the like), or the like.

In any of the embodiments described above, the model(s) may include statistical algorithms. For example, the model(s) may include regression models that estimate the relationships among variables associated with the sought data set(s) and generate synthetic sets based thereon. In some aspects, the model(s) may additionally or alternatively sort elements of the sought data set(s) using one or more classifiers to determine probabilities used to generate synthetic data sets based thereon. The model(s) may be parametric, non-parametric, and/or semi-parametric.

In some embodiments, the model(s) may include a convolutional neural network model. The convolutional neural network may comprise an input layer, one or more middle layers, and one or more output layers. In some embodiments, the input layer may comprise multiple matrices (e.g., a matrix for pixel values in an image, a matrix for characters in an input string, or the like). Alternatively, the input layer may comprise a single matrix (e.g., a single matrix of pixel brightness values, a single matrix of character distributions, or the like). In some aspects, one or more middle layers and/or the output layer may be a deterministic function of the values of the preceding layer.

The convolutional neural network may include one or more convolutional layers. A convolutional layer may be configured to convolve one or more spatial filters with the convolutional layer input to generate a convolutional layer output tensor. One or more spatial filter functions may be defined by a matrix of weights to be applied to the elements of the preceding layer during a convolution operation, an offset, and/or an activation function. Training the convolutional neural network may comprise modifying the weights and offsets using a backpropagation algorithm. In some embodiments, the convolutional neural network may also include pooling layers and/or fully connected layers.

Additionally or alternatively, the model(s) may include a deep fully connected neural network. The deep fully connected neural network may comprise an input layer, one or more middle layers, and one or more output layers. The middle layer(s) may be fully connected. Accordingly, one or more middle layers may have a plurality of neurons (or nodes), the neurons being connected to one or more (or all) neurons of the previously layer.

Additionally or alternatively, the model(s) may include a recurrent neural network. The recurrent neural network may comprise an input layer, one or more middle layers, and one or more output layers. The middle layer(s) may include a plurality of neurons (or nodes) that use input from one or more neurons of a previous layer in combination with previous (in time) states and/or outputs of the neuron itself.

Although the above examples include neural networks, other embodiments may include additional or alternative models. For example, additionally or alternatively, the model(s) may include Random Forests, composed of a combination of decision trees. Such decision trees may comprise a data structure mapping observations about an input (e.g., the sought data set(s)), in the "branch" of the tree, to conclusions about a target value, in the "leaves" of the tree. In such aspects, the conclusions may be used to generate synthetic data based on the observations about the input. An individual tree may depend on the values of a random vector sampled independently and with the same distribution for a plurality of (or all) trees in the forest. Any other machine learned models may be applied in addition to or in lieu of a Random Forest model.

In embodiments where the query includes one or more functions, system 200 may directly retrieve relevant data set(s) using an index of functions (e.g., developed by function estimator 214). In embodiments where the query includes one or more models, input simulator 212 may retrieve or generate a test set of inputs for the model(s) and apply the model(s) to the test set of inputs to generate a corresponding set of outputs, and function estimator 214 may estimate one or more functions based on the test set of inputs and the corresponding set of outputs. Accordingly, system 200 may retrieve relevant data set(s) using the estimated function(s) and an index of functions for stored data sets (e.g., developed by function estimator 214).

Accordingly, processor 204 may retrieve indexed data sets matching the query, e.g., from database(s) 202 and/or database(s) 206. As used herein, matching may include a perfect match or a fuzzy match. A fuzzy match may be found using similarities between functions in the index and the one or more functions from function estimator 214 (or otherwise included in the query) without a perfect match. For example, domains may overlap beyond a threshold, such as an area threshold, a volume threshold, or the like, ranges may overlap beyond a threshold, such as an area threshold, a volume threshold, or the like, one or more coefficients may lie within a threshold, a numerator or denominator of a rational function may have the same expression, a numerator or denominator of a rational function may have constants or coefficients or orders within a threshold, or any other clustering technique may be used to identify fuzzy matches.

In some embodiments, system 200 may output the retrieved data set(s) without further processing. In other embodiments, system 200 may use a comparator to further generate one or more measures of matching between the query and the retrieved data set(s), e.g., in embodiments using fuzzy matching. For example, a measure of matching may comprise one or more composite scores based on distances between functions associated with the retrieved set(s) and corresponding functions of the query (e.g., from function estimator 214 or included in the query).

Additionally or alternatively, the comparator may cluster one or more functions associated with the retrieved set(s) and corresponding functions of the query (e.g., from function estimator 214 or included in the query). For example, the comparator may apply one or more thresholds to one or more coefficients or other components of the functions associated with the retrieved set(s), corresponding coefficients or other components of the functions of the query (e.g., from function estimator 214 or included in the query), or distances therebetween in order to classify the retrieved data set(s) into one or more clusters. Additionally or alternatively, the comparator may apply hierarchical clustering, centroid-based clustering, distribution-based clustering, density-based clustering, or the like to the one or more coefficients or other components of the functions associated with the retrieved set(s), the corresponding coefficients or other components of the functions of the query (e.g., from function estimator 214 or included in the query), or the distances therebetween. In any of the embodiments described above, the comparator may perform fuzzy clustering such that each retrieved data set has an associated score (such as 3 out of 5, 22.5 out of 100, a letter grade such as 'A' or 'C,' or the like) indicating a degree of belongingness in each cluster. The measures of matching may then be based on the clusters (e.g., distances between a cluster including the query and clusters including the retrieved data set(s) or the like). The comparator may comprise a software module and/or one or more hardware comparators.

The results (e.g., the retrieved data set(s), optionally with one or more determined measures of matching) may be output for storage, e.g., in databases 206. Additionally or alternatively, the results may be output to an external device, e.g., another server, a third party data repository (e.g., AMAZON WEB SERVICES S3 buckets), a user such an administrator diagnosing a problem, or the like. For example, the results may be output to a user using one or more graphical user interfaces (GUIs).

Figure 2B:
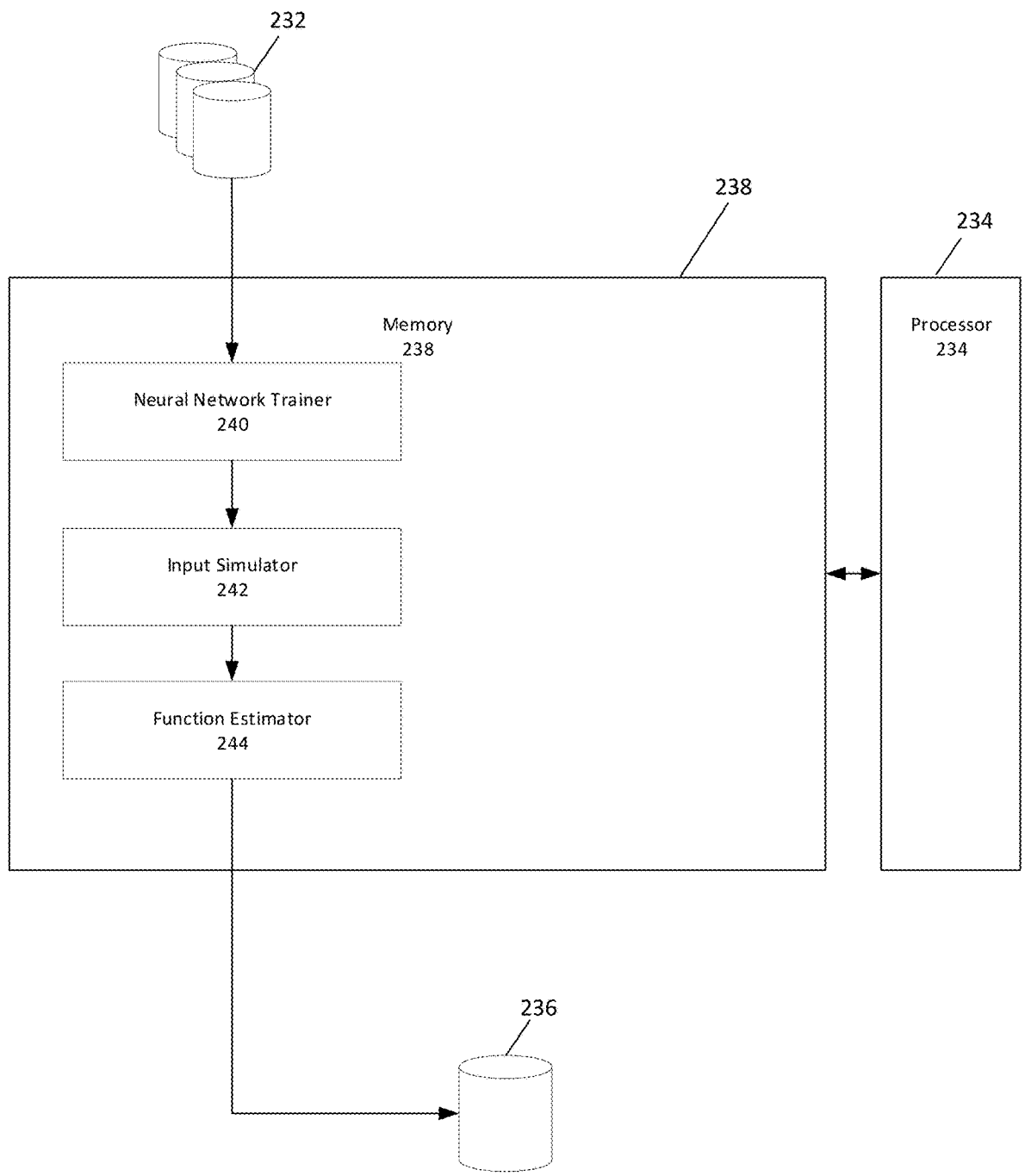
FIG. 2B depicts another exemplary system for indexing data sets using associated neural networks, consistent with disclosed embodiments.

FIG. 2B depicts another exemplary system 230 for indexing data sets, consistent with disclosed embodiments. System 230 may include one or more databases 232, one or more processors 234, and one or more databases 236. The one or more processors may execute one or more programs (e.g., neural network trainer 240, input simulator 242, and function estimator 244) for indexing data sets. The one or more programs may be stored in a memory 238, as depicted in FIG. 2B. System 230 may be implemented as a component of system 100 or may be a system separate from system 100.

Databases 232 may include one or more databases configured to store data sets for use by system 230. In some embodiments, databases 232 may be included in database 115 of system 100. Databases 232 can include cloud-based databases (e.g., AMAZON WEB SERVICES S3 buckets) and/or on-premises databases. In some embodiments, databases 232 may additionally store data models for parsing the data sets (e.g., from unstructured data to structured data) or for generating synthetic data sets.

Databases 236 may also include one or more databases configured to store data for use by system 200. Databases 236 can include cloud-based databases (e.g., AMAZON WEB SERVICES S3 buckets) and/or on-premises databases. In some embodiments, databases 236 may store training data for the data models and/or indexing information associated with the data sets. Database 236 may be included as a part of previously described database 115.

Similar to neural network fetcher 210 of FIG. 2A, neural network trainer 240 of FIG. 2B may receive one or more data sets from databases 202. The one or more data sets may include text files (e.g., logs generated by one or more applications), image files, or any other set of unstructured or structured data.

Neural network trainer 240 may further train one or more models based on the received data set(s). In an embodiment, the one or more models may comprise one or more linear regressions, neural networks, or the like that generate synthetic data with one or more structural similarities to the received data set(s). As used herein, a structural similarity may refer to any similarity in organization (e.g., one or more overlapping columns, form fields, or the like), any similarity in statistical measures (e.g., statistical distribution of letters, numbers, pixels, or the like), or the like. Accordingly, in one example, neural network trainer 240 may train the one or more models by building or retrieving a structure for the model and then adjusting parameters of the structure to reduce an associated loss function. For example, if the model comprises a neural network, training may comprise adjusting activation functions and/or weights of the nodes to reduce the associated loss function. The associated loss function may comprise a square loss function, a hinge loss functions, a logistic loss function, a cross entropy loss function, or any other loss function. Neural network trainer 240 may reduce the associated loss function using a minimization algorithm, such as an MM algorithm, Newton's algorithm, or any other iterative or heuristic optimization algorithms.

In some embodiments, neural network trainer 240 may use one or more training data sets, e.g., stored in databases 232 and/or databases 236 or otherwise received by neural network trainer 240, to increase accuracy of the trained model(s). In some embodiments, the model(s) comprise generative adversarial networks or other models configured for unsupervised learning such that further training data may be generated by the model itself.

In any of the embodiments described above, the model(s) may include statistical algorithms. For example, the model(s) may include regression models that estimate the relationships among variables associated with the received data set(s) and generate synthetic sets based thereon. In some aspects, the model(s) may additionally or alternatively sort elements of the received data set(s) using one or more classifiers to determine probabilities used to generate synthetic data sets based thereon. The model(s) may be parametric, non-parametric, and/or semi-parametric.

In some embodiments, the model(s) may include a convolutional neural network model. The convolutional neural network may comprise an input layer, one or more middle layers, and one or more output layers. In some embodiments, the input layer may comprise multiple matrices (e.g., a matrix for pixel values in an image, a matrix for characters in an input string, or the like). Alternatively, the input layer may comprise a single matrix (e.g., a single matrix of pixel brightness values, a single matrix of character distributions, or the like). In some aspects, one or more middle layers and/or the output layer may be a deterministic function of the values of the preceding layer.

The convolutional neural network may include one or more convolutional layers. A convolutional layer may be configured to convolve one or more spatial filters with the convolutional layer input to generate a convolutional layer output tensor. One or more spatial filter functions may be defined by a matrix of weights to be applied to the elements of the preceding layer during a convolution operation, an offset, and/or an activation function. Training the convolutional neural network may comprise modifying the weights and offsets using a backpropagation algorithm. In some embodiments, the convolutional neural network may also include pooling layers and/or fully connected layers.

Additionally or alternatively, the model(s) may include a deep fully connected neural network. The deep fully connected neural network may comprise an input layer, one or more middle layers, and one or more output layers. The middle layer(s) may be fully connected. Accordingly, one or more middle layers may have a plurality of neurons (or nodes), the neurons being connected to one or more (or all) neurons of the previously layer.

Additionally or alternatively, the model(s) may include a recurrent neural network. The recurrent neural network may comprise an input layer, one or more middle layers, and one or more output layers. The middle layer(s) may include a plurality of neurons (or nodes) that use input from one or more neurons of a previous layer in combination with previous (in time) states and/or outputs of the neuron itself.

Although the above examples include neural networks, other embodiments may include additional or alternative models. For example, additionally or alternatively, the model(s) may include Random Forests, composed of a combination of decision trees. Such decision trees may comprise a data structure mapping observations about an input, in the "branch" of the tree, to conclusions about a target value, in the "leaves" of the tree. In such aspects, the conclusions may be used to generate synthetic data based on the observations about the input. An individual tree may depend on the values of a random vector sampled independently and with the same distribution for a plurality of (or all) trees in the forest. Any other machine learned models may be applied in addition to or in lieu of a Random Forest model.

Input simulator 242 may receive one or more models trained by neural network trainer 240 and select one or more inputs for the model(s). Accordingly, any functions performed by input simulator 212 of FIG. 2A may be similarly performed by input simulator 242 of FIG. 2B. For example, input simulator 242 may further apply the model(s) to the test set of inputs to generate a corresponding set of outputs.

Function estimator 244 may receive the test set of inputs and corresponding set of outputs from input simulator 242 and estimate a function based thereon. Accordingly, any functions performed by function estimator 214 of FIG. 2A may be similarly performed by function estimator 244 of FIG. 2B. For example, function estimator 244 may additionally or alternatively estimate one or more features more likely to have resulted in the corresponding set of outputs from the test set of inputs than other features and/or map the estimated function(s) to one or more portions of the model(s), as explained above with respect to function estimator 214.

Function estimator 244 may further index the received data set(s) by the estimated function(s), the one or more features, and/or the one or more portions of the model(s). Accordingly, function estimator 244 may generate a relational mapping, a graphical mapping, or any other index configured for use to search the received data set(s) based on the estimated function(s), the one or more features, and/or the portions of the model(s).

As further depicted in FIG. 2B, the indexed data sets may be output for storage, e.g., in databases 236. Additionally or alternatively, the indexed data sets may be output to an external device, e.g., another server, a third party data repository (e.g., AMAZON WEB SERVICES S3 buckets), a user such an administrator diagnosing a problem, or the like.

In some embodiments, system 230 may also execute a query against the indexed data set(s). For example, system 230 may execute a query similar to how system 200 executes a query as explained above. In some embodiments, system 230 may further train one or more model(s) based on the query. For example, neural network trainer 240 may train one or more model(s) using one or more data set(s) included in the query. As explained above, neural network trainer 240 may train the one or more models by building or retrieving a structure for the model and then adjusting parameters of the structure to reduce an associated loss function. For example, if the model comprises a neural network, training may comprise adjusting activation functions and/or weights of the nodes to reduce the associated loss function. The associated loss function may comprise a square loss function, a hinge loss functions, a logistic loss function, a cross entropy loss function, or any other loss function. Neural network trainer 240 may reduce the associated loss function using a minimization algorithm, such as an MM algorithm, Newton's algorithm, or any other iterative or heuristic optimization algorithms. System 230 may then execute the query using the trained model(s) similar to how system 200 executes the query using one or more received models.

FIG. 3A is an illustration of exemplary neural network 300 having at least one hidden layer. As depicted in FIG. 3A, neural network 300 may include an input layer 320 that accepts inputs, e.g., input 310-1, . . . , input 310-m. Inputs may include an image, text, or any other structure or unstructured data for processing by neural network 300. In some embodiments, neural network 300 may accept a plurality of inputs simultaneously. For example, in FIG. 3A, neural network 300 may accept up to m inputs simultaneously. Additionally or alternatively, input layer 320 may accept up to m inputs in rapid succession, e.g., such that input 310-1 is accepted by input layer 320 in one cycle, a second input is accepted by input layer 320 in a second cycle in which input layer 320 pushes data from input 310-1 to a first hidden layer, and so on.

Input layer 320 may comprise one or more nodes, e.g., node 320-1, node 320-2, . . . , node 320-a. Each node may apply an activation function to corresponding input (e.g., one or more of input 310-1, . . . , input 310-m) and weight the output from the activation function by a particular weight associated with the node. An activation function may comprise a Heaviside step function, a Gaussian function, a multiquadratic function, an inverse multiquadratic function, a sigmoidal function, or the like. A weight may comprise a positive value between 0.0 and 1.0 or any other numerical value configured to allow some nodes in a layer to have corresponding output scaled more or less than output corresponding to other nodes in the layer.

As further depicted in FIG. 3A, neural network 300 may include one or more hidden layers, e.g., hidden layer 330-1, . . . , hidden layer 330-n. Each hidden layer may comprise one or more nodes. For example, in FIG. 3A, hidden layer 330-1 comprises node 330-1-1, node 330-1-2, node 330-1-3, . . . , node 330-1-b, and hidden layer 330-n comprises node 330-n-1, node 330-n-2, node 130-n-3, . . . , node 330-n-c. Similar to nodes of input layer 320, nodes of the hidden layers may apply activation functions to output from connected nodes of the previous layer and weight the output from the activation functions by particular weights associated with the nodes. As explained above with respect to FIGS. 2A and 2B, these hidden layers may be used by autoencoders to generate feature matrices.

As further depicted in FIG. 3A, neural network 300 may include an output layer 340 that finalizes outputs, e.g., output 350-1, output 350-2, . . . , output 350-d. Output layer 340 may comprise one or more nodes, e.g., node 340-1, node 340-2, . . . , node 340-d. Similar to nodes of input layer 320 and of the hidden layers, nodes of output layer 340 may apply activation functions to output from connected nodes of the previous layer and weight the output from the activation functions by particular weights associated with the nodes. In some embodiments, output layer 340 may generate structure versions of data input to input layer 320. In other embodiments, output layer 340 may generate synthetic versions of data input to input layer 320.

FIG. 3B is an illustration of exemplary neural network 300' having at least one hidden layer. Neural network 300' is structured similar to neural network 300 of FIG. 3B but comprises one or more seed values 310 as input to nodes of input layer 320 rather than inputs 310-1, . . . , 310-m to individual nodes of input layer 320. For example, seed values 310 may comprise random values, pseudorandom values, or values generated using one or more statistical techniques. For example, seed values 310 may comprise a Gaussian pattern, a Poisson distribution, or the like. In some embodiment, the one or more statistical techniques may be stochastic, e.g., comprising a Monte Carlo algorithm or the like.

Accordingly, in some embodiments and as shown in FIGS. 3A and 3B, one or more of input layer 320 and its corresponding nodes, e.g., node 320-1, node 320-2, . . . , node 320-a, the one or more hidden layers, e.g., hidden layer 330-1, . . . , hidden layer 330-n, and their corresponding nodes (e.g., node 330-1-1, node 330-1-2, node 330-1-3, . . . , node 330-1-b, node 330-n-1, node 330-n-2, node 130-n-3, . . . , node 330-n-c), and output layer 340 and its corresponding nodes, e.g., node 340-1, node 340-2, . . . , node 340-d, may be the same in both neural network 300 and neural network 300'. Other embodiments may use one or more different nodes in neural network 300 accepting individual inputs as compared to neural network 300' accepting seed values.

As further depicted in FIG. 3B, one or more pooling layers, e.g., pooling layer 350, may combine outputs from the nodes of output layer 340. For example, pooling layer 350 may comprise a max pooling layer, an average pooling layer, or any other pooling layer. In embodiments not depicted, neural network 300 may include one or more pooling layers similar to pooling layer 350 of FIG. 3B. In further embodiments not depicted, neural network 300' may use outputs directly from nodes of output layer 340, e.g., similar to outputs 350-1, 350-2, . . . 350-d of FIG. 3A.

Although depicted as fully connected in FIGS. 3A and 3B, the layers of neural network 300 or 300' may use any connection scheme. For example, one or more layers (e.g., input layer 320, hidden layer 330-1, . . . , hidden layer 330-n, output layer 340, or the like) may be connected using a convolutional scheme, a sparsely connected scheme, or the like. Such embodiments may use fewer connections between one layer and a previous layer than depicted in FIGS. 3A and 3B.

Figure 4:
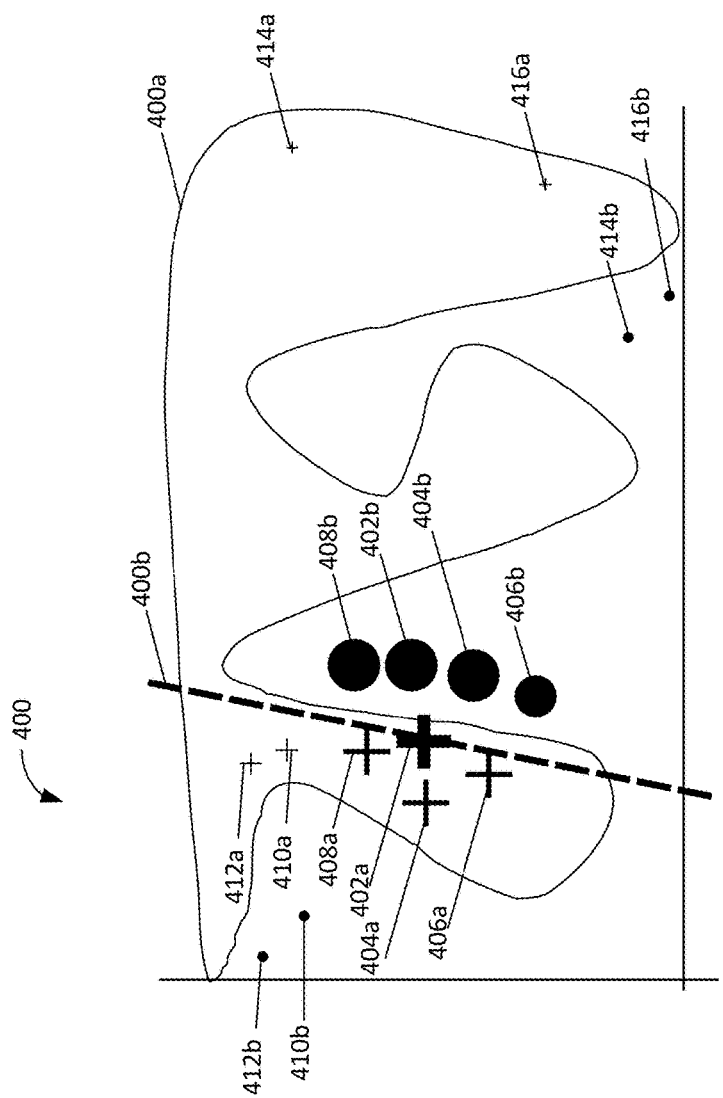
FIG. 4 depicts an exemplary graphical representation of calculating a function to locally estimate a global function of a neural network, consistent with disclosed embodiments.

FIG. 4 is a graphical illustration 400 of estimating a function to approximate a model (e.g., as performed by function estimator 214 of FIG. 2A and/or function estimator 244 of FIG. 2B). As depicted in FIG. 4, a test set of inputs (e.g., inputs 402a, 404a, 406a, 408a, 410a, 412a, 414a, and 416a) may be provided to a model that generates corresponding outputs (e.g., outputs 402b, 404b, 406b, 408b, 410b, 412b, 414b, and 416b). The global function for the model is depicted as 400a in FIG. 4 but may represent any complex function mapping the input space of the model to the corresponding output space. Function estimator 214 and/or function estimator 244 may, based on the test set of inputs and the corresponding set of outputs, calculate function 400b to locally approximate function 400a.

For example, function 400b may comprise a linear approximation of function 400a, as depicted in FIG. 4. Other approximations may be used, such as exponential approximations, sinusoidal approximations, any rational function, or the like.

Moreover, function estimator 214 and/or function estimator 244 may use any number of inputs even though the example of FIG. 4 uses eight (8). For example, function estimator 214 and/or function estimator 244 may use greater or fewer inputs than depicted in FIG. 4.

Figure 5:
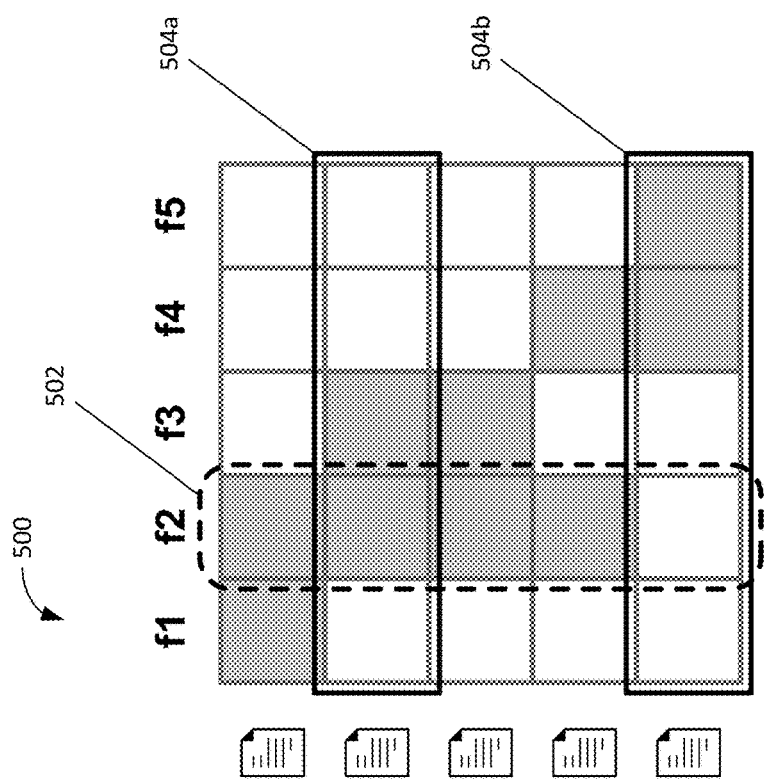
FIG. 5 depicts another exemplary graphical representation of calculating a function to locally estimate a global function of a neural network, consistent with disclosed embodiments.

FIG. 5 is a graphical illustration 500 of estimating relevant features based on a test set of inputs and corresponding set of outputs (e.g., as performed by function estimator 214 of FIG. 2A and/or function estimator 244 of FIG. 2B). As depicted in FIG. 5, five test inputs are depicted with corresponding features (shown as f1, f2, f3, f4, or f5, depending on which boxes are shaded) extracted by a relevant model (e.g., model 400 of FIG. 4 or the like).

In the example of FIG. 5, function estimator 214 and/or function estimator 244 uses a greedy algorithm to identify important features. For example, function estimator 214 and/or function estimator 244 may identify feature f2 as the most common feature extracted by the model. Based on feature f2, function estimator 214 and/or function estimator 244 may select inputs 504a and 504b as exemplary inputs for features f3 and f4, which are next most common. Moreover, function estimator 214 and/or function estimator 244 may select inputs 504a and 504b to avoid redundancy (e.g., input 504a adds feature f3 and input 504b adds feature f4).

Accordingly, function estimator 214 and/or function estimator 244 may use a greedy algorithm, e.g., as depicted in FIG. 5. Other algorithms may be used to identify relevant features.

Moreover, function estimator 214 and/or function estimator 244 may use any number of inputs even though the example of FIG. 4 uses five (5). For example, function estimator 214 and/or function estimator 244 may use greater or fewer inputs than depicted in FIG. 5.

Figure 6:
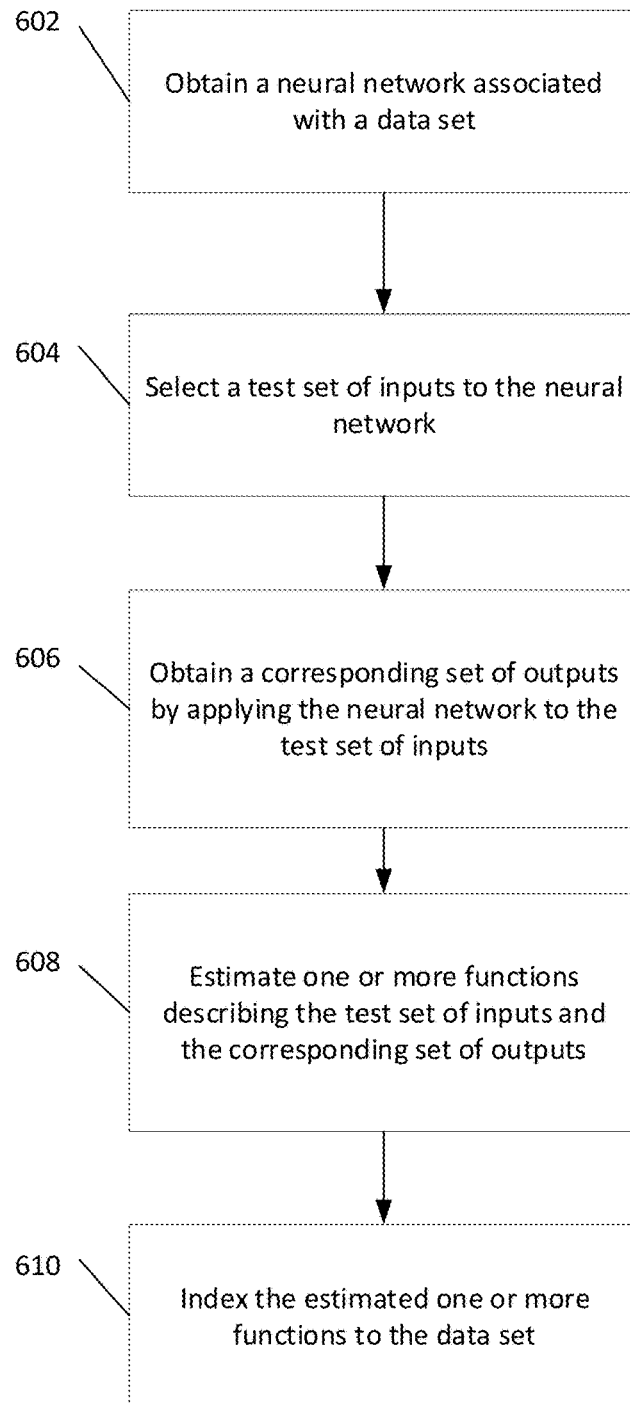
FIG. 6 depicts an exemplary process for indexing data sets using associated neural networks, consistent with disclosed embodiments.

FIG. 6 is a flow diagram of an exemplary process 600 for indexing data sets. Process 600 may be executed by a system, e.g., system 200 described above.

At step 602, a processor, e.g., processor 204 of system 200, may obtain a neural network associated with a data set. For example, as explained above with respect to FIG. 2A, processor 204 may obtain the neural network from databases 202 using any data structure linking the neural network to the data set. As explained above, the neural network may be trained to generate synthetic data sets related to the data set. In some embodiments, the at least one data set may comprise at least one of a plurality of text files, a plurality of spreadsheets, or a plurality of images. Additionally or alternatively, the neural network may comprise at least one of a convolutional neural network, a recurrent neural network, an auto-encoder, a variational auto-encoder, or a generative adversarial network.

In some embodiments, the synthetic data sets may be grouped within a same category as the data set. For example, the category may comprise an application generating the data set and/or an output from a classifier applied to the data set.

At step 604, the processor may select a test set of inputs to the neural network. As explained above, the processor may retrieve or generate the test set of inputs. For example, the processor may retrieve the test set of inputs from databases 202 and/or generate the test set of inputs using a stochastic algorithm, such as a Monte Carlo algorithm.

At step 606, the processor may obtain a corresponding set of outputs by applying the neural network to the test set of inputs. For example, if the neural network is configured to generate synthetic data, the corresponding set of outputs may comprise one or more synthetic data sets generated in response to the test set of inputs. In another example, if the neural network is configured to parse data (e.g., convert unstructured data to structured data), the corresponding set of outputs may comprise structured data generated in response to unstructured data of the test set of inputs.

At step 608, the processor may estimate one or more functions describing the test set of inputs and the corresponding set of outputs. For example, as explained above with respect to function estimator 214, the processor may employ a linear regression or Taylor series to estimate a polynomial function, a Fourier series to estimate a sinusoidal function, or any other technique to estimate a function that models the test set of inputs to the corresponding set of outputs. Thus, as depicted in FIG. 4, the one or more functions may comprise local approximations of a global function representing the neural network, such as polynomial approximations, harmonic approximations, or the like. Moreover, the processor may minimize squares, error values, a loss function, or any other measure of how closely the calculated functions fits the test set of inputs to the corresponding set of outputs.

In some embodiments, as explained above and depicted in FIG. 5, the processor may further estimate one or more features more likely to have resulted in the corresponding set of outputs from the test set of inputs than other features. For example, the processor may use distances between the test set of inputs and the calculated function, commonality of features across the test set of inputs and the corresponding set of outputs, or any other technique to extract the one or more features. Moreover, a greedy algorithm or any other ranking algorithm may be used to extract the one or more features in a particular order.

At step 610, the processor may index the estimated one or more functions to the data set. For example, the processor may generate a relational index such that the data set is retrievable using the one or more functions. In other embodiments, the processor may generate a graphical index such that the data set is a node and is connected, via an edge, to one or more nodes representing the one or more functions.

In addition, the processor may cluster indexed data sets using associated functions. For example, the clustering may include applying one or more thresholds to one or more coefficients or other components of the one or more functions to generate one or more clusters. Additionally or alternatively, the clustering may comprise at least one of hierarchical clustering, centroid-based clustering, distribution-based clustering, or density-based clustering.

In some embodiments, the clustering may comprise fuzzy clustering such that each data set has a score associated with a degree of belonging in each cluster generated by the clustering. In such embodiments, the processor may store the corresponding data sets in association with each degree of belonging.

Method 600 may further include additional steps. For example, the processor may enable searching for data sets using the index. For example, the processor may store the one data set with the index such that the index is searchable. In embodiments where data sets are clustered, the processor may additionally store any clusters associated with the data set.

Figure 7:
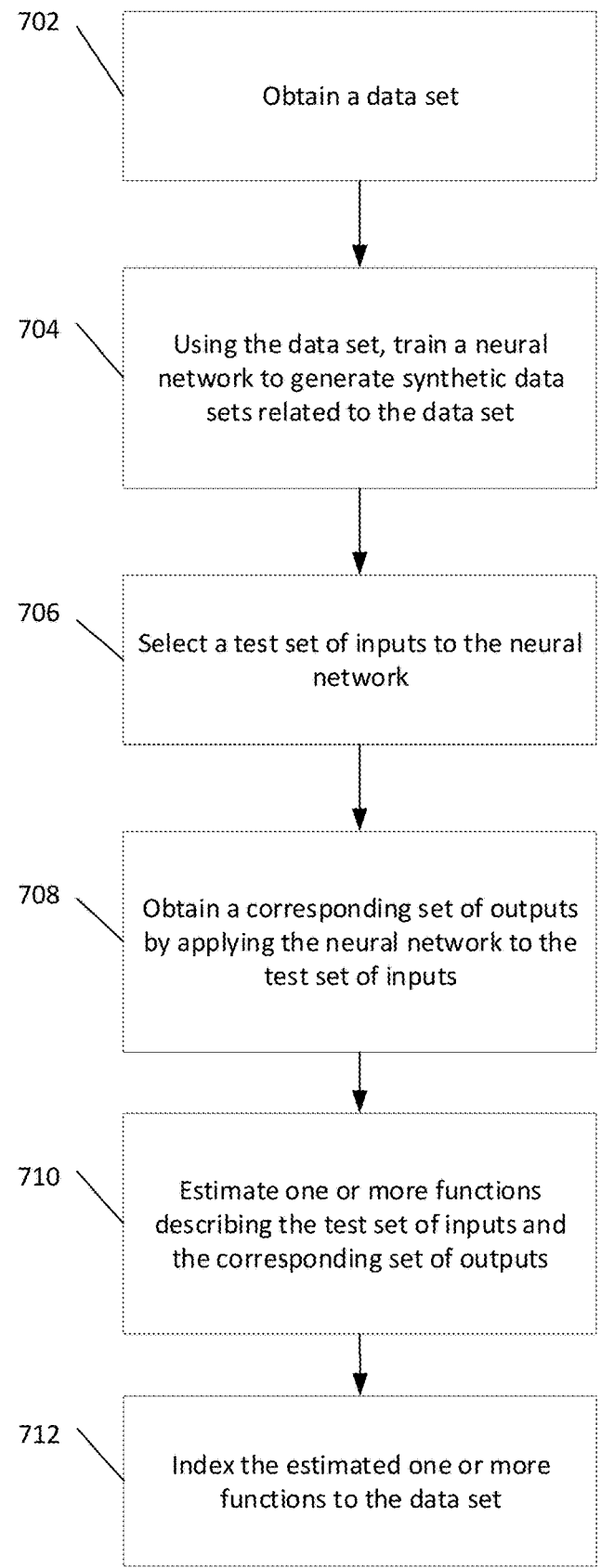
FIG. 7 depicts another exemplary process for indexing data sets using associated neural networks, consistent with disclosed embodiments.

FIG. 7 is a flow diagram of another exemplary process 700 for indexing data sets consistent with disclosed embodiments. Process 700 may be executed by a system, e.g., system 230 described above.

At step 702, a processor, e.g., processor 204 of system 200, may obtain a data set. For example, as explained above with respect to FIG. 2A, processor 204 may obtain the data set from databases 202 or as an input from one or more interfaces. As explained above, the data set may comprise at least one of a plurality of text files, a plurality of spreadsheets, or a plurality of images.

At step 704, the processor may use the data set to train a neural network to generate synthetic data sets related to the data set. As explained above, the synthetic data sets may be structurally similar to the data set. For example, the synthetic data sets may be grouped within a same category as the data set, such as an application generating the data set and/or an output from a classifier applied to the data set.

The neural network may comprise at least one of a convolutional neural network, a recurrent neural network, an auto-encoder, a variational auto-encoder, or a generative adversarial network. Additionally or alternatively, training the neural network may further use a plurality of test sets having an associated category matching a category of the data set.

In any such embodiments, training may comprise adjusting activation functions and/or weights of nodes of the neural network to reduce the associated loss function. The associated loss function may comprise a square loss function, a hinge loss functions, a logistic loss function, a cross entropy loss function, or any other loss function. As explained above with respect to neural network trainer 240, the processor may reduce the associated loss function using a minimization algorithm, such as an MM algorithm, Newton's algorithm, or any other iterative or heuristic optimization algorithms.

At step 706, the processor may select a test set of inputs to the neural network. As explained above, the processor may retrieve or generate the test set of inputs. For example, the processor may retrieve the test set of inputs from databases 202 and/or generate the test set of inputs using a stochastic algorithm, such as a Monte Carlo algorithm.

At step 708, the processor may obtain a corresponding set of outputs by applying the neural network to the test set of inputs. For example, if the neural network is configured to generate synthetic data, the corresponding set of outputs may comprise one or more synthetic data sets generated in response to the test set of inputs. In another example, if the neural network is configured to parse data (e.g., convert unstructured data to structured data), the corresponding set of outputs may comprise structured data generated in response to unstructured data of the test set of inputs.

At step 710, the processor may estimate one or more functions describing the test set of inputs and the corresponding set of outputs. For example, as explained above with respect to function estimator 214, the processor may employ a linear regression or Taylor series to estimate a polynomial function, a Fourier series to estimate a sinusoidal function, or any other technique to estimate a function that models the test set of inputs to the corresponding set of outputs. Thus, as depicted in FIG. 4, the one or more functions may comprise local approximations of a global function representing the neural network, such as polynomial approximations, harmonic approximations, or the like. Moreover, the processor may minimize squares, error values, a loss function, or any other measure of how closely the calculated functions fits the test set of inputs to the corresponding set of outputs.

In some embodiments, as explained above and depicted in FIG. 5, the processor may further estimate one or more features more likely to have resulted in the corresponding set of outputs from the test set of inputs than other features. For example, the processor may use distances between the test set of inputs and the calculated function, commonality of features across the test set of inputs and the corresponding set of outputs, or any other technique to extract the one or more features. Moreover, a greedy algorithm or any other ranking algorithm may be used to extract the one or more features in a particular order.

At step 712, the processor may index the estimated one or more functions to the data set. For example, the processor may generate a relational index such that the data set is retrievable using the one or more functions. In other embodiments, the processor may generate a graphical index such that the data set is a node and is connected, via an edge, to one or more nodes representing the one or more functions.

In addition, the processor may cluster indexed data sets using associated functions. For example, the clustering may include applying one or more thresholds to one or more coefficients or other components of the one or more functions to generate one or more clusters. Additionally or alternatively, the clustering may comprise at least one of hierarchical clustering, centroid-based clustering, distribution-based clustering, or density-based clustering.

In some embodiments, the clustering may comprise fuzzy clustering such that each data set has a score associated with a degree of belonging in each cluster generated by the clustering. In such embodiments, the processor may store the corresponding data sets in association with each degree of belonging.

Method 700 may further include additional steps. For example, the processor may enable searching for data sets using the index. For example, the processor may store the one data set with the index such that the index is searchable. In embodiments where data sets are clustered, the processor may additionally store any clusters associated with the data set.

Figure 8:
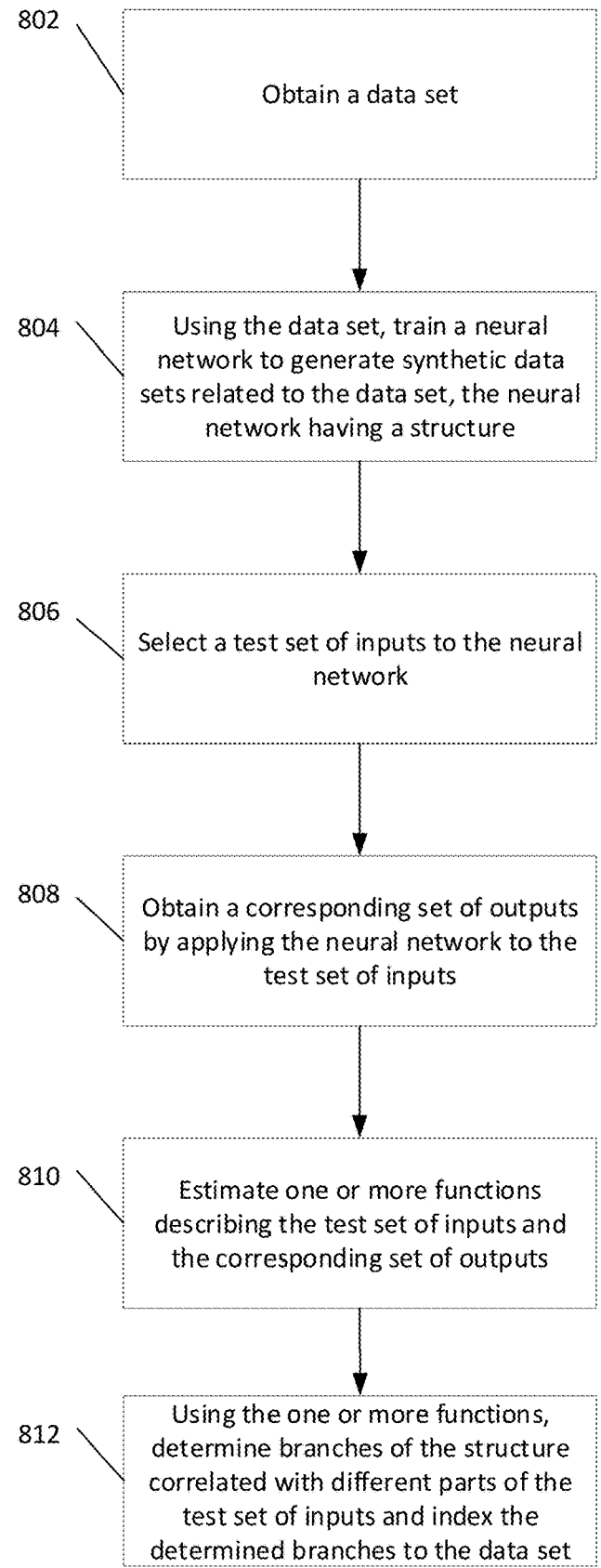
FIG. 8 depicts yet another exemplary process for indexing data sets using associated neural networks, consistent with disclosed embodiments.

FIG. 8 is a flow diagram of an exemplary process 800 for training neural networks to index data sets consistent with disclosed embodiments. Process 800 may be executed by a system, e.g., system 200 described above.

At step 802, a processor, e.g., processor 204 of system 200, may obtain a data set. For example, as explained above with respect to FIG. 2A, processor 204 may obtain the data set from databases 202 or as an input from one or more interfaces. As explained above, the data set may comprise at least one of a plurality of text files, a plurality of spreadsheets, or a plurality of images.

At step 804, the processor may use the data set to train a neural network to generate synthetic data sets related to the data set. As explained above, the synthetic data sets may be structurally similar to the data set. For example, the synthetic data sets may be grouped within a same category as the data set, such as an application generating the data set and/or an output from a classifier applied to the data set.

The neural network may comprise at least one of a convolutional neural network, a recurrent neural network, an auto-encoder, a variational auto-encoder, or a generative adversarial network. Additionally or alternatively, training the neural network may further use a plurality of test sets having an associated category matching a category of the data set.

In any such embodiments, training may comprise adjusting activation functions and/or weights of nodes of the neural network to reduce the associated loss function. The associated loss function may comprise a square loss function, a hinge loss functions, a logistic loss function, a cross entropy loss function, or any other loss function. As explained above with respect to neural network trainer 240, the processor may reduce the associated loss function using a minimization algorithm, such as an MM algorithm, Newton's algorithm, or any other iterative or heuristic optimization algorithms.

At step 806, the processor may select a test set of inputs to the neural network. As explained above, the processor may retrieve or generate the test set of inputs. For example, the processor may retrieve the test set of inputs from databases 202 and/or generate the test set of inputs using a stochastic algorithm, such as a Monte Carlo algorithm.

At step 808, the processor may obtain a corresponding set of outputs by applying the neural network to the test set of inputs. For example, if the neural network is configured to generate synthetic data, the corresponding set of outputs may comprise one or more synthetic data sets generated in response to the test set of inputs. In another example, if the neural network is configured to parse data (e.g., convert unstructured data to structured data), the corresponding set of outputs may comprise structured data generated in response to unstructured data of the test set of inputs.

At step 810, the processor may estimate one or more functions describing the test set of inputs and the corresponding set of outputs. For example, as explained above with respect to function estimator 214, the processor may employ a linear regression or Taylor series to estimate a polynomial function, a Fourier series to estimate a sinusoidal function, or any other technique to estimate a function that models the test set of inputs to the corresponding set of outputs. Thus, as depicted in FIG. 4, the one or more functions may comprise local approximations of a global function representing the neural network, such as polynomial approximations, harmonic approximations, or the like. Moreover, the processor may minimize squares, error values, a loss function, or any other measure of how closely the calculated functions fits the test set of inputs to the corresponding set of outputs.

In some embodiments, as explained above and depicted in FIG. 5, the processor may further estimate one or more features more likely to have resulted in the corresponding set of outputs from the test set of inputs than other features. For example, the processor may use distances between the test set of inputs and the calculated function, commonality of features across the test set of inputs and the corresponding set of outputs, or any other technique to extract the one or more features. Moreover, a greedy algorithm or any other ranking algorithm may be used to extract the one or more features in a particular order.

At step 810, the processor may determine branches of a structure of the neural network that are correlated with different parts of the test set of inputs. For example, as explained above, the processor may identify one or more activation functions within nodes of the branches that are closest to the estimated function(s) (e.g., in absolute distance or in any other measure of distance between functions). Additionally or alternatively, in embodiments where the processor estimates one or more features more likely to have resulted in the corresponding set of outputs from the test set of inputs than other features, the processor may map the one or more features to the branches For example, the processor may identify one or more activation functions within nodes of the branches that are triggered by the one or more features.

Further, at step 810, the processor may index the determined branches to the data set. For example, the processor may generate a relational index such that the data set is retrievable using the branches. In other embodiments, the processor may generate a graphical index such that the data set is a node and is connected, via an edge, to one or more nodes representing the branches.

In addition, the processor may cluster indexed data sets using associated branches. For example, the clustering may include applying one or more thresholds to one or more activation functions, weights, or other components of the branches to generate one or more clusters. Additionally or alternatively, the clustering may comprise at least one of hierarchical clustering, centroid-based clustering, distribution-based clustering, or density-based clustering.

In some embodiments, the clustering may comprise fuzzy clustering such that each data set has a score associated with a degree of belonging in each cluster generated by the clustering. In such embodiments, the processor may store the corresponding data sets in association with each degree of belonging.

Method 800 may further include additional steps. For example, the processor may enable searching for data sets using the index. For example, the processor may store the one data set with the index such that the index is searchable. In embodiments where data sets are clustered, the processor may additionally store any clusters associated with the data set.

Moreover, any indices from methods 600, 700, and/or 800 may be used to process searches for data sets. For example, a processor, e.g., processor 204 of system 200 or processor 234 or system 230, may receive a search query including at least one of a neural network model or a sample data set. In some embodiments, the query may comprise a database language query (such as a structure query language (SQL) command). In other embodiments, the query may comprise a natural language query. In such embodiments, the processor may apply natural language processing to the query to determine one or more data sets relevant to the query and generate, based on the relevant data sets, a database language query corresponding to the natural language query for executing.

The query may comprise one or more functions for which the processor may use an index to retrieve matching data sets. Additionally or alternatively, the query may comprise one or more models for which related data sets are sought. Accordingly, the processor may select and/or generate a test set of inputs, apply the one or more models of the query to the test set of inputs to obtain corresponding outputs, and estimate one or more functions based on the test set of inputs and the corresponding set of outputs. The processor may use the index to retrieve data sets matching the estimated one or more functions. Additionally or alternatively, the query may comprise one or more data sets for which similar data sets are sought. Accordingly, the processor may generate one or more models (e.g., a neural network) configured to generate synthetic data with structure similarities to the one or more data sets of the query. Moreover, the processor may select and/or generate a test set of inputs, apply the generated model(s) to the test set of inputs to obtain corresponding outputs, and estimate one or more functions based on the test set of inputs and the corresponding set of outputs. The processor may use the index to retrieve data sets matching the estimated one or more functions.

In any of these embodiments, the processor may apply a SQL command corresponding to the one or more functions to a relational index. In another example, the processor may apply an ArangoDB query language (AQL) command or other NoSQL command corresponding to the one or more functions to a graphical index. The index may include functions associated with the data sets. Moreover, the database of data sets may be clustered, and the clusters may be based on the functions, as explained above.

The processor may return one or more matching data sets. Moreover, in some embodiments, the processor may return measure of comparison as a further response to the query, e.g., when using a fuzzy match, as explained above. For example, the processor may display the results by clustering the matching data sets according to the corresponding measures of comparison on a graphical user interface (GUI).

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for classifying data sets by corresponding functions, comprising:
    at least one processor; and
    at least one non-transitory memory storing instructions that, when executed by the at least one processor cause the system to perform operations comprising:
        obtaining a neural network associated with a characteristic of a first data set, the neural network being trained to generate synthetic data sets having at least the characteristic of the first data set;
        selecting a test set of inputs for the neural network;
        obtaining a corresponding set of outputs from the neural network, by applying the neural network to the test set of inputs, the neural network outputs comprising a second data set, the second data set comprising synthetic data;
        estimating one or more corresponding functions that model the test set of inputs to the corresponding set of neural network outputs; and
        indexing the estimated one or more functions to the first data set.

2. The system of claim 1, wherein the operations further comprise storing the indexed functions and datasets in a function index.

3. The system of claim 2, wherein the operations further comprise
    receiving a search query indicating at least one search query function;
    searching the function index based on the search query; and
    returning, based on the search, the first data set.

4. The system of claim 3, wherein searching the function index based on the search query comprises matching the search query function to a function stored in the function index.

5. The system of claim 4, wherein matching the search query comprises finding a fuzzy match between the search query function and a function stored in the function index.

6. The system of claim 3, wherein searching the function index based on the search query comprises:
    clustering one or more functions of the function index to form a plurality of function clusters; and
    matching the search query function to a first cluster of the plurality of clusters.

7. The system of claim 6, wherein matching the search query function to a first cluster comprises:
    generating a score for the first cluster indicating a degree of belongingness of the search query function to the first cluster; and
    determining that the score exceeds a predetermined threshold.

8. A computer-implemented method for classifying data sets by corresponding functions comprising:
    obtaining a neural network associated with a characteristic of a first data set, the neural network being trained to generate synthetic data sets having at least the characteristic of the first data set;
    selecting a test set of inputs for the neural network;
    obtaining a corresponding set of outputs, from the neural network, by applying the neural network to the test set of inputs, the neural network outputs comprising a second data set, the second data set comprising synthetic data;
    estimating one or more corresponding functions that model the test set of inputs to the corresponding set of neural network outputs; and
    indexing the estimated one or more functions to the first data set.

9. The method of claim 8, wherein the first data set comprises at one of text files or image files.

10. The method of claim 8, further comprising generating the test set of inputs using a stochastic algorithm.

11. The method of claim 8, wherein the one or more functions comprise local approximations of a global function representing the neural network.

12. The method of claim 8, wherein the one or more functions comprise polynomial approximations.

13. The method of claim 8, wherein the one or more functions comprise harmonic approximations.

14. The method of claim 8, further comprising wherein the neural network comprises at least one of a convolutional neural network, a recurrent neural network, an auto-encoder, a variational auto-encoder, or a generative adversarial network.

15. A system for classifying data sets by corresponding functions, comprising:
    at least one processor; and
    at least one non-transitory memory storing instructions that, when executed by the at least one processor cause the system to perform operations comprising:

obtaining a first data set;

training, using the first data set, a neural network to generate synthetic data sets having a characteristic associated with the first data set;

selecting a test set of inputs for the neural network;

obtaining a corresponding set of outputs, from the neural network, by applying the neural network to the test set of inputs, the neural network outputs comprising a second data set, the second data set comprising synthetic data;

estimating one or more corresponding functions that model the test set of inputs to the corresponding set of neural network outputs;

indexing the estimated one or more functions to the first data set; and storing the indexed functions and datasets in a function index.

16. The system of claim 15, wherein the operations further comprise:

receiving a search query indicating at least one search query function;

searching the function index based on the search query; and returning, based on the search, the first data set.

17. The system of claim 16, wherein searching the function index based on the search query comprises matching the search query function to a function stored in the function index.

18. The system of claim 17, wherein matching the search query comprises finding a fuzzy match between the search query function and a function stored in the function index.

19. The system of claim 15, wherein searching the function index based on the search query comprises:

clustering one or more functions of the function index to form a plurality of function clusters; and matching the search query function to a first cluster of the plurality of clusters.

20. The system of claim 19, wherein matching the search query function to a first cluster comprises:

generating a score for the first cluster indicating a degree of belongingness of the search query function to the first cluster; and determining that the score exceeds a predetermined threshold.

* * * * *